United States Patent
Sarig et al.

(10) Patent No.: US 8,536,808 B2
(45) Date of Patent: Sep. 17, 2013

(54) CMOS BOOTSTRAP CIRCUIT FOR DC/DC BUCK CONVERTER USING LOW VOLTAGE CMOS DIODE

(75) Inventors: Erez Sarig, Hertzeliya (IL); Raz Reshef, Tel Aviv (IL)

(73) Assignee: Tower Semiconductor Ltd., Migdal Haemek (IL)

( * ) Notice: Subject to any disclaimer, the term of this patent is extended or adjusted under 35 U.S.C. 154(b) by 152 days.

(21) Appl. No.: 13/304,197

(22) Filed: Nov. 23, 2011

(65) Prior Publication Data

US 2013/0127371 A1     May 23, 2013

(51) Int. Cl.
| G05F 1/00 | (2006.01) |
| G05F 1/10 | (2006.01) |
| H05B 37/02 | (2006.01) |
| H02M 3/07 | (2006.01) |

(52) U.S. Cl.
USPC .............. 315/360; 327/589; 323/282; 363/89

(58) Field of Classification Search
USPC ......... 315/360, 307, 297; 327/589; 323/282, 323/288; 363/89
See application file for complete search history.

(56) References Cited

U.S. PATENT DOCUMENTS

| 7,046,040 | B2 | 5/2006 | Guedon |
| 2008/0218141 | A1* | 9/2008 | Lu et al. .................... 323/282 |
| 2009/0135632 | A1* | 5/2009 | Sohma ......................... 363/89 |
| 2010/0156372 | A1* | 6/2010 | Kobayashi et al. ........... 323/282 |

* cited by examiner

*Primary Examiner* — Daniel D Chang
(74) *Attorney, Agent, or Firm* — Bever, Hoffman & Harms, LLP; Patrick T. Bever

(57) ABSTRACT

A modified bootstrap circuit utilized, for example, in a high voltage DC/DC CMOS buck converter to convert a high input voltage (e.g., 24V) to a regulated voltage (e.g., 4V) for use, for example, by an LED driver circuit. The bootstrap circuit utilizes a feedback diode and a PMOS switch to avoid high reverse diode voltages across a low voltage bootstrap diode. A bootstrapped buck converter implements the bootstrap circuit to generate a high gate voltage on a high-side NMOS switch during all operating phases. The PMOS switch is controlled by the NMOS switch's output voltage to pass a system voltage (e.g., 5V) through the bootstrap diode whenever the output voltage drops low (e.g., 0V), and to shut off when the output voltage subsequently rises such that the feedback diode forward biases to pass the output voltage to the anode of the bootstrap diode.

17 Claims, 4 Drawing Sheets

US 8,536,808 B2

CMOS BOOTSTRAP CIRCUIT FOR DC/DC BUCK CONVERTER USING LOW VOLTAGE CMOS DIODE

FIELD OF THE INVENTION

This invention relates to integrated circuit devices fabricated by established process flows, and more particularly to a CMOS bootstrap circuit and to a bootstrapped buck converter incorporating the CMOS bootstrap circuit.

BACKGROUND OF THE INVENTION

Buck converters are a type of switching-type DC-to-DC voltage regulator that generate a direct current (DC) load (output) voltage that is substantially lower than an available direct current (DC) "input" voltage. In contrast, boost converters are a second type of switching-type DC-to-DC voltage regulator that generate a "stepped up" output voltage (i.e., the output voltage is higher than the applied DC input voltage). In terms of power supply efficiency switching-type regulators can operate at about 90% or better.

FIG. 4 shows an exemplary conventional asynchronous DC/DC buck converter 10 with diode including an N-type CMOS (NMOS) high-side switch (transistor) 11, an associated control signal source 12, an inductor L, and a diode D. A capacitor C and a resistor R represent an applied load. NMOS switch 11 is connected between a high input voltage supply $V_{IN}$ and a high-side switch output node LX, and has a gate terminal connected to receive a square-wave gate voltage $V_G$ from control signal source 12. Signal source 12 utilizes an error amplifier ERR-AMP, a pulse width modulator circuit PWM, and an oscillating oscillator OSC to generate square-wave gate voltage $V_G$ whose duty cycle causes NMOS switch 11 to intermittently connect high input voltage $V_{IN}$ to high-side switch output node LX such that the regulated load voltage $V_{REG}$ (e.g., 4V) is generated across capacitor C and resistor R.

A practical problem associated with the implementation of DC/DC buck converter 10 involves power loss in NMOS switch 11 when the switch is on. In particular, high current flow through NMOS switch 11, combined with the resistance of NMOS switch 11 in the on state, generates a significant power loss equal to $I^2R$. Power loss on NMOS switch 11 is created during start-up process (switching power loss), and also after start-up is completed when NMOS switch 11 is "fully on" due to its rds-on resistance combined with high load DC current. High power loss occurs at the beginning of every operating period because NMOS switch 11 is subjected to a maximum drain-to-source voltage when input voltage $V_{IN}$ is applied to its drain terminal, but output voltage $V_{LX}$ at its source terminal is still at or near 0V. In order to charge high-side switch output node LX to $V_{IN}$ through NMOS switch 11 and reduce power loss, gate voltage $V_G$ should be equal to or greater than input voltage $V_{IN}$ plus the threshold voltage $V_T$ of NMOS switch 11 (i.e., $V_{IN}+V_T$). In order to reduce power loss, when NMOS switch 11 is fully on, gate voltage $V_G$ needs to be increased even more to decrease rds-on resistance of NMOS switch 11. Power loss when NMOS switch 11 is fully on is typically dominant power loss factor and is dependant on buck converter duty cycle. DC/DC buck converter 10 does not include a source of ideal start-up gate voltage $V_{IN}+V_T$ or higher voltage to reduce rds-on resistance.

FIG. 5 shows a bootstrapped buck converter 20 that addresses the problems presented above utilizing a prior art bootstrap circuit solution that is taught, for example, in U.S. Pat. No. 7,046,040. Similar to buck converter 10, bootstrapped buck converter 20 includes an NMOS switch 21 and a square-wave signal source 22 (depicted for brevity as an operational amplifier) that are constructed essentially as described above in order to generate a regulated voltage $V_{REG}$ across output terminals "+" and "−". Bootstrapped buck converter 20 differs from buck converter 10 in that it includes a bootstrap circuit 25 made up of a bootstrap diode $D_{BOOT}$ and a bootstrap capacitor $C_{BOOT}$ that are connected in series between a system voltage supply $V_{DD}$ (e.g., 5V) and a high-side switch output node LX, and serves to generate a bootstrap voltage $V_{BOOT}$ at a bootstrap node BOOT that is used to boost gate voltage $V_G$ when NMOS switch 21 is on. At the beginning of the operating period (i.e., when high-side switch output voltage $V_{LX}$ is still close to 0V), bootstrap diode $D_{BOOT}$ passes system voltage $V_{DD}$ to bootstrap capacitor $C_{BOOT}$, whereby bootstrap voltage $V_{BOOT}$ is raised to system voltage $V_{DD}$ minus a voltage drop across bootstrap diode $D_{BOOT}$ (i.e., $V_{BOOT}=V_{DD}-V_{DIODE}$). Because square-wave signal source 22 utilizes bootstrap voltage $V_{BOOT}$ to generate square-wave gate signal $V_G$, and because bootstrap voltage $V_{BOOT}$ is greater than the ideal start-up gate voltage (i.e., $V_{IN}+V_T$), NMOS switch 21 fully turns on at the beginning of operation and its rds-on resistance is also smaller after start-up process is completed, thereby avoiding the power loss associated with buck converter 10 (discussed above).

A problem with conventional bootstrapped buck converter 20 is that bootstrap diode $D_{BOOT}$ must be both able to supply the necessary bias voltage without injecting significant current to the CMOS substrate while in forward bias, and be able to withstand high reverse voltages without breakdown when node LX is at $V_{IN}$. That is, high-side switch output node LX toggles between 0V to $V_{IN}$ during operation, and boot voltage $V_{BOOT}$ follows these changes by way of boot capacitor $C_{BOOT}$. Specifically, boot node voltage $V_{BOOT}$ is charged to $V_{DD}-V_{DIODE}$ (i.e., voltage $V_{DD}$ minus voltage $V_{DIODE}$) via boot diode $D_{BOOT}$ when output voltage $V_{LX}$=0V, and when gate voltage $V_G$ charges to boot voltage $V_{BOOT}$, high-side switch output node LX is charged via switch 21, causing boot voltage $V_{BOOT}$ to rise to $V_{IN}+V_{DD}-V_{DIODE}$. Eventually, output voltage $V_{LX}$ will reach $V_{IN}$ level with gate voltage $V_G$ of switch 21 equal to $V_{IN}+V_{DD}-V_{DIODE}$. Although CMOS diodes having a sufficiently high breakdown voltage may be implemented using an established CMOS process flow, this approach would inject significant current to the CMOS substrate while in forward bias, or would require additional process steps which makes fabrication more expensive.

External bootstrap diodes are sometimes used to implement bootstrap diode $D_{BOOT}$ of buck converter 20 to avoid issues related to the use of high voltage integrated semiconductor (e.g., CMOS) internal (on-chip) diodes, but the use of external diodes presents problems as well. The use of high voltage internal diodes is problematic because such diodes take up a large amount of chip area. Moreover, although CMOS diodes having a sufficiently high breakdown voltage may be implemented using an established CMOS process flow, this approach would inject significant current to the CMOS substrate while in forward bias, or would require additional process steps that make fabrication more expensive. A problem with the practice of using external diodes to produce the desired bootstrap characteristics is that external diodes are relatively expensive due to both the component cost and the assembly costs associated with mounting the external diodes. Further, the external diode takes up a valuable device pin, which prevents the use of that pin for other input/output signals.

What is needed is a CMOS buck converter including a bootstrap circuit that avoids the high reverse voltages produced by conventional bootstrapping approaches, thereby facilitating the use of low voltage integrated semiconductor CMOS diodes. What is also needed is a bootstrap circuit architecture that employs low cost diodes that supply the necessary bias voltage without injecting significant currents to the CMOS substrate while in forward bias.

SUMMARY OF THE INVENTION

The present invention is directed to a modified CMOS bootstrap circuit in which a feedback diode is utilized to maintain a low reverse voltage across the bootstrap diode during periods of operation when the bootstrap circuit's output voltage is high (e.g., 24V), thereby avoiding the high reverse voltages associated with conventional bootstrap circuits, thus facilitating the use of low-cost CMOS diodes. The modified CMOS bootstrap circuit is similar to conventional bootstrap circuits in that it includes a bootstrap diode and a bootstrap capacitor that are connected in series and coupled between the system voltage supply and a relevant internal system node (e.g., the high-side switch output node). However, the modified CMOS bootstrap circuit differs from conventional feedback circuits in that it also includes a feedback diode. The feedback diode is connected between the high-side switch output node and a first bootstrap node, which is connected to the anode of the bootstrap diode, and is arranged to forward bias whenever the bootstrap circuit's output voltage is high (e.g., 24V) to maintain a low voltage potential across the bootstrap diode. For example, as the bootstrap voltage stored on the bootstrap capacitor (i.e., on the cathode of the bootstrap diode) increases from its relatively low initial voltage to a high voltage due to an increasing the output voltage on the high-side switch output node, the feedback diode maintains a low voltage potential across the bootstrap diode by simultaneously passing the increasing output voltage to the anode of the bootstrap diode. That is, the feedback diode of the present invention functions to maintain substantially the same voltage on both the anode and the cathode of the bootstrap diode during operating periods when the bootstrap circuit's output voltage is high. Because a low voltage potential is maintained across the bootstrap diode, the bootstrap diode avoids the high reverse voltages produced by conventional bootstrapping approaches, thereby facilitating the production of modified CMOS bootstrap circuit using low voltage integrated semiconductor CMOS diodes.

According to an aspect of the invention, the modified CMOS bootstrap circuit also includes a CMOS switch that turns on to pass a system voltage to the bootstrap diode whenever the bootstrap circuit's output voltage drops low, and shuts off when the output voltage subsequently rises and the feedback diode forward biases to pass the output voltage to the anode of the bootstrap diode. That is, the anode of the bootstrap diode is isolated from the system voltage by the "turned off" CMOS switch while the feedback diode is forward biased by a high bootstrap circuit output voltage, and is connected to the system voltage by the "turned on" CMOS switch when the feedback diode is reverse biased due to a low bootstrap circuit output voltage. In one embodiment, the CMOS switch is implemented by PMOS transistor whose gate terminal is connected to the bootstrap circuit's output voltage (i.e., the high-side switch output node). With this arrangement, the PMOS transistor (switch) is turned on whenever the bootstrap circuit's output voltage is at or near 0V, and is turned off when the output voltage increases above a predetermined threshold.

According to an embodiment of the present invention, the bootstrap diode and the feedback diode are formed as vertical NPN diodes. Integrated CMOS diodes, such as those utilized in the modified CMOS bootstrap circuit of the present invention, should not inject large currents into the semiconductor (e.g., silicon substrate) while in forward bias. In the context described herein, a simple "P+ to N-well" diode will create an injection current through the parasitic PNP transistor (emitter is P+, base is N-well and collector is P-substrate), i.e., such that a major part of the active current of the forward biased diodes flows to the P-substrate rather than to the intended nodes. A relatively expensive solution this problem includes forming the diode on an N+ buried layer (NBL), which can prevent injection currents to the P-substrate by heavily doping the base (i.e., N-well with NBL), thereby making the beta of the parasitic PNP very low. However, the modified CMOS bootstrap circuit of the present invention does not need to use the expensive NBL process—it can instead be implemented by a vertical NPN stack in which the upper N-doped layer (emitter) forms the cathode, and the deep N-well (base) and the P-doped layer (collector) are shorted together to form the anode. Direct active currents of forward biased diodes of this type will flow between N+ and P base of NPN, which is an isolated P-doped layer and therefore does not inject current to P-substrate. The emitter of the parasitic PNP transistor (emitter is P, base is deep N-well, collector is P-substrate) has its emitter (i.e., the base of the NPN stack) is shorted to the base (i.e., the collector of the NPN stack), thereby turning off the parasitic PNP and providing a diode structure for the modified CMOS bootstrap circuit of the present invention that exhibits very low substrate injection current while in forward bias.

According to another embodiment, a CMOS bootstrapped buck converter utilizes the modified CMOS bootstrap circuit of the present invention to convert a relatively high input voltage (e.g., 24V) to generate a relatively low regulated voltage (e.g., 4V) that is supplied to a load circuit (e.g., a light-emitting diode (LED) driver circuit), where both the bootstrapped buck converter and the load circuit are integrally fabricated on a semiconductor substrate using an established CMOS process flow. The inductor is typically external because of the need for high inductance values. The buck converter includes an N-type MOS transistor connected between a source of the high input voltage and a high-side switch output node, and a control circuit that generates a square-wave gate voltage on a gate terminal of the N-type MOS transistor, wherein a duty cycle of the square-wave gate voltage causes the N-type MOS transistor to intermittently connect the high input voltage supply to the high-side switch output node such that the regulated voltage is supplied to the load circuit. In this embodiment, the bootstrap circuit serves to temporarily supply a relatively low system voltage (e.g., 5V) to the square-wave gate voltage generator whenever the bootstrap circuit's output voltage is at or near 0V, and to transmit a relatively high (second) voltage (e.g., up to 24V) from the high-side switch output node to the square-wave gate voltage generator when the bootstrap circuit's output voltage is at the relatively high (second) voltage. In a specific embodiment, the N-type MOS transistor of the buck converter and the P-type MOS transistor of the bootstrap circuit are implemented using laterally diffused metal oxide semiconductor transistors (i.e., NLDMOS and PLDMOS transistors, respectively).

According to yet another embodiment, a CMOS circuit includes a load circuit (e.g., an LED driver) and the bootstrapped buck converter of the present invention, where both the load circuit and the bootstrapped buck converter are integrally fabricated on a semiconductor substrate using an established CMOS process flow. Both asynchronous (i.e., using a low side diode) buck converter and a synchronous (i.e., using a low side NMOS transistor controlled by a pre-driver) buck converter are disclosed.

BRIEF DESCRIPTION OF THE DRAWINGS

These and other features, aspects and advantages of the present invention will become better understood with regard to the following description, appended claims, and accompanying drawings, where:

DETAILED DESCRIPTION OF THE DRAWINGS

The present invention relates to an improved CMOS boot circuit architecture for, e.g., DC/DC buck converters, using low voltage diodes on a cost effective CMOS platform. The following description is presented to enable one of ordinary skill in the art to make and use the invention as provided in the context of a particular application and its requirements. As used herein, the phrases "integrally fabricated" and "integrally formed" is used herein to describe two or more integrated circuit components that are fabricated on a single semiconductor (e.g., silicon) substrate during a single CMOS process flow (i.e., the relevant components are simultaneously fabricated with other components on separate areas of the substrate). Further, the terms "coupled" and "connected", which are utilized herein, are defined as follows. The term "connected" is used to describe a direct connection between two circuit elements, for example, by way of a metal line formed in accordance with normal integrated circuit fabrication techniques. In contrast, the term "coupled" is used to describe either a direct connection or an indirect connection between two circuit elements that are disposed in a single path. For example, two coupled elements may be directly connected by way of a metal line, or indirectly connected by way of an intervening circuit element (e.g., a capacitor, resistor, inductor, or by way of the source/drain terminals of a transistor). Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

Figure 1:
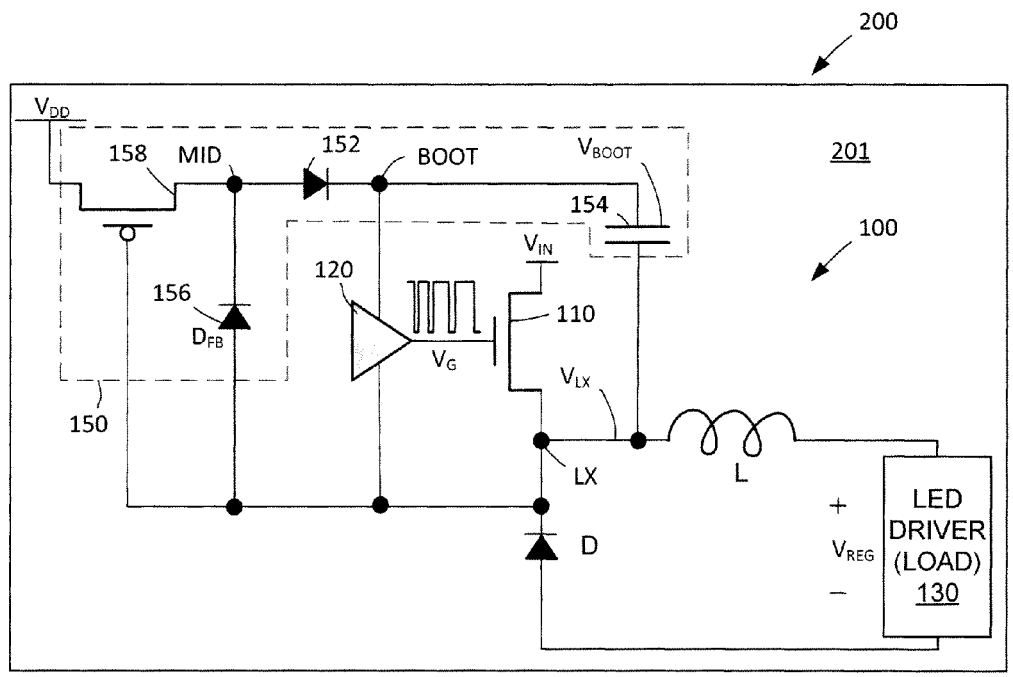
FIG. 1 is a circuit diagram showing a CMOS device including a bootstrapped buck converter having a modified bootstrap circuit according to a simplified exemplary embodiment of the present invention.

FIG. 1 is a simplified circuit diagram showing a CMOS circuit 200 including a bootstrapped buck converter 100 utilizing a modified bootstrap circuit 150 according to an exemplary embodiment of the present invention. According to an aspect of the present invention, modified bootstrap circuit 150 is entirely integrally fabricated on a single semiconductor substrate 201 using a CMOS process flow, along with the remaining portions of bootstrapped buck converter 100 and LED driver circuit 130. Note that LED driver circuits are known to those skilled in the art, and the particular architecture of LED driver circuit 130 is not relevant to the novel aspects of the present invention, so a detailed description of LED driver circuit 130 is omitted herein for brevity.

Similar to conventional bootstrap circuits, modified CMOS bootstrap circuit 150 includes a bootstrap diode 152 and a bootstrap capacitor 154 that are connected in series and coupled between a system voltage supply $V_{DD}$ (e.g., 5V) and an internal system (high-side switch output) node LX. Specifically, bootstrap diode 152 has an anode connected to a first bootstrap node MID and a cathode connected to a second bootstrap node BOOT, and bootstrap capacitor 154 is connected between second bootstrap node BOOT and high-side switch output node LX. Bootstrap diode 152 and bootstrap capacitor 154 operate similar to conventional bootstrap circuits in the bootstrap diode 152 forward biases to pass voltage $V_{DD}-V_{DIODE}$ (i.e., system voltage $V_{DD}$ minus a small voltage drop $V_{DIODE}$ caused by bootstrap diode 152) to second bootstrap node BOOT during operating periods when high-side switch output node LX drops low, and bootstrap capacitor 154 serves to maintain system voltage $V_{DD}-V_{DIODE}$ on bootstrap node BOOT until a (second) output voltage $V_{LX}$ at switch output node LX reaches a normal operating level (e.g., 24V), at which time voltage $V_{LX}$ is passed by way of bootstrap capacitor 154 to the bootstrap node BOOT.

According to a first aspect of the present invention, modified CMOS bootstrap circuit 150 differs from conventional bootstrap circuits in a feedback diode 156 is connected between switch output node LX and first bootstrap node MID in order to maintain a low reverse voltage across the bootstrap diode 152 when output voltage $V_{LX}$ is at the normal (high) operating level, thereby avoiding the high reverse voltages associated with conventional bootstrap circuits, thus facilitating the use of low-cost CMOS diodes. For example, at the beginning of a start-up period (or any other time when output voltage $V_{LX}$ is 0V), bootstrap capacitor 154 stores a relatively low bootstrap voltage $V_{BOOT}$ on bootstrap node BOOT that is equal to system voltage $V_{DD}$ minus a voltage drop across bootstrap diode (i.e., $V_{BOOT}=V_{DD}-V_{DIODE}$). Note that feedback diode 156 remains off during this period due to the low voltage at node LX. As output voltage $V_{LX}$ increases at system output node LX, which occurs because bootstrap voltage $V_{BOOT}$ generates a gate voltage $V_G$ that turns on switch 110, bootstrap node BOOT is also increased by way of bootstrap capacitor 154, whereby the voltage level applied to the cathode of bootstrap diode 152 is increased. However, the increasing output voltage $V_{LX}$ at node LX also forward biases feedback diode 156, which passes output voltage $V_{LX}$ to the anode of bootstrap diode 152, thereby maintaining a low voltage across bootstrap diode 152. Further, because any change in output voltage $V_{LX}$ is essentially mirrored on both terminals of bootstrap diode 152, the low voltage across bootstrap diode 152 is maintained under all operating conditions. Because a low voltage potential is maintained across bootstrap diode 152 at all times, bootstrap diode 152 avoids the high reverse voltages produced by conventional bootstrapping approaches, thereby facilitating the production of modified CMOS bootstrap circuit 150 using low voltage integrated semiconductor CMOS diodes (e.g., having a low breakdown voltage of 8V or less, preferably 5V or less).

Figure 2:
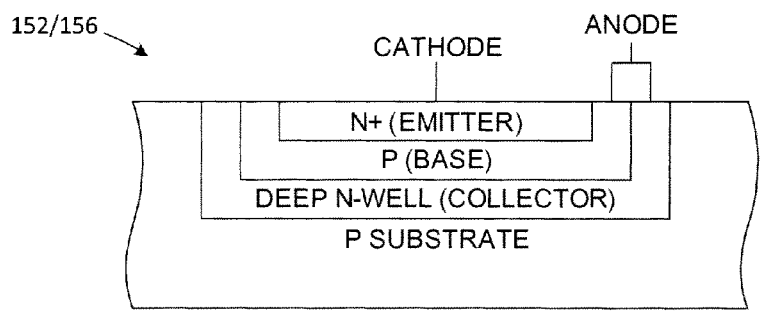
FIG. 2 is a simplified cross-sectional side view showing a vertical NPN diode utilized in the modified bootstrap circuit shown in FIG. 1.

FIG. 2 is a simplified cross-sectional side view showing a diodes structure utilized to implement bootstrap diode 152 and feedback diode 156 according to a specific embodiment of the present invention. As set forth in the background section, integrated CMOS diodes utilized in CMOS bootstrap circuits should not inject large currents into the semiconductor (e.g., silicon substrate) while in forward bias. In the context of modified bootstrap circuit 150 (described above), a simple "P+ to N-well" diode structure will create an undesirable injection current through the parasitic PNP transistor (emitter is P+, base is N-well and collector is P-substrate). A relatively expensive solution this problem involves forming diodes 152 and 156 on an N+ buried layer (NBL), which can prevent injection currents to the P-substrate by heavily doping the base (i.e., N-well with NBL), thereby making the beta of the parasitic PNP very low. Although such diode structures may be used, modified CMOS bootstrap circuit 150 does not need to use the expensive NBL process. In accordance with a presently preferred embodiment, bootstrap diode 152 and feedback diode 156 are implemented by the vertical NPN stack shown in FIG. 2, where the upper N-doped layer (emitter) forms the cathode, and the deep N-well (base) and the P-doped layer (collector) are shorted together to form the anode. With this structure, direct active currents of the forward biased diode will flow between N+ and P base of the NPN stack, which is an isolated P-doped layer, and therefore does not inject current to the P-substrate. Further, a possible parasitic PNP transistor (i.e., the emitter is formed by the P-doped layer, the base is formed by the deep N-well, and the collector is formed by the P-substrate) has its emitter (i.e., the base of the NPN stack shown in FIG. 2) and base (i.e., the collector of the NPN stack in FIG. 2) shorted together, and therefore remains off, thereby providing diode structures for the modified CMOS bootstrap circuit 150 of the present invention that exhibit very low substrate injection currents while in forward bias.

Referring again to FIG. 1, according to a second aspect of the present invention, modified CMOS bootstrap circuit 150 also includes a CMOS switch 158 that serves to disconnect system voltage $V_{DD}$ from bootstrap diode 152 when output voltage $V_{LX}$ is at or near input voltage $V_{IN}$, thereby isolating bootstrap node MID from system voltage $V_{DD}$ and allowing diode 156 to charge bootstrap node MID to $V_{LX}-V_{DIODE}$. In the exemplary embodiment shown in FIG. 1, CMOS switch 158 is implemented by a PMOS transistor whose gate terminal is connected to switch output node LX. With this arrangement, CMOS switch 158 is turned on when voltage $V_{LX}$ is at or near 0V, and turns off to isolate system voltage supply $V_{DD}$ from bootstrap diode 152 as voltage $V_{LX}$ increases during the later stages of operation.

Referring again to FIG. 1, in accordance with another embodiment of the present invention, bootstrapped buck converter 100 utilizes modified CMOS bootstrap circuit 150 to convert a relatively high input voltage $V_{IN}$ (e.g., 24V) to a relatively low regulated voltage $V_{REG}$ (e.g., 4V) that is supplied to LED driver (or other load) circuit 130. Buck converter 100 includes an N-type MOS transistor (high-side switch) 110 connected between high input voltage $V_{IN}$ and a high-side switch output node LX, and a control circuit 120 that generates a square-wave gate voltage $V_G$ on a gate terminal of the N-type MOS transistor 110. Control circuit 120 is constructed and operates essentially in the manner described in the background section, whereby a duty cycle of square-wave gate voltage $V_G$ causes N-type MOS transistor 110 to intermittently connect voltage supply $V_{IN}$ to switch output node LX such that regulated voltage $V_{REG}$ is supplied to LED driver circuit 130.

According to a presently preferred embodiment of the present invention, N-type laterally diffused metal oxide semiconductor (NLDMOS) are utilized to implement N-type MOS transistor (high-side switch) 110 of buck converter 100. NLDMOS structures are known to those skilled in the art. N-type MOS transistor 110 is implemented using a NLDMOS transistor in order to minimize the "on" resistance and to hold the desired high voltage (e.g., 24V) without breakdown. For similar reasons, P-type MOS transistor 158 of the bootstrap circuit 150 is implemented using a P-type laterally diffused metal oxide semiconductor (PLDMOS) transistor.

Figure 3A:
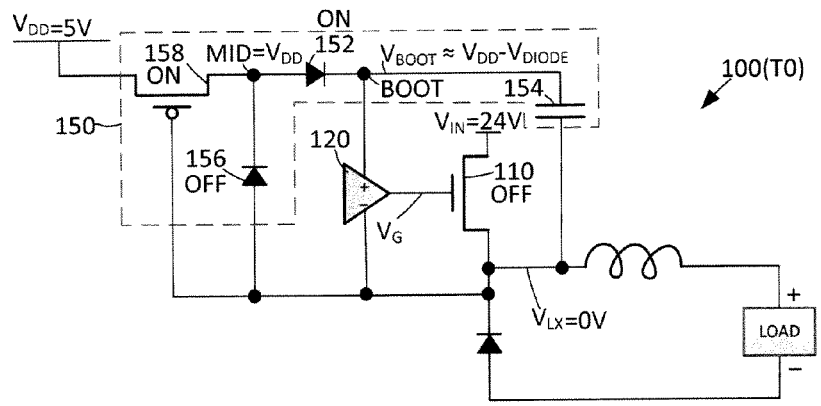
FIGS. 3(A), 3(B) and 3(C) are circuit diagram showing operating states and exemplary voltages generated on the buck converter of FIG. 1 during operation.
Figure 3B:
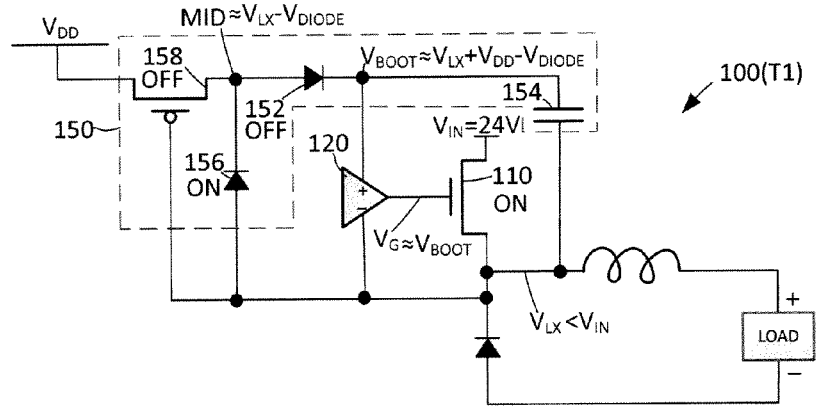
Figure 3C:
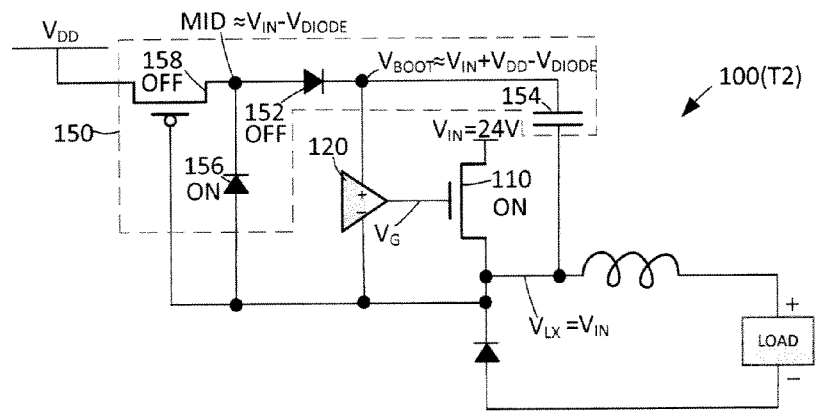
Figure 4:
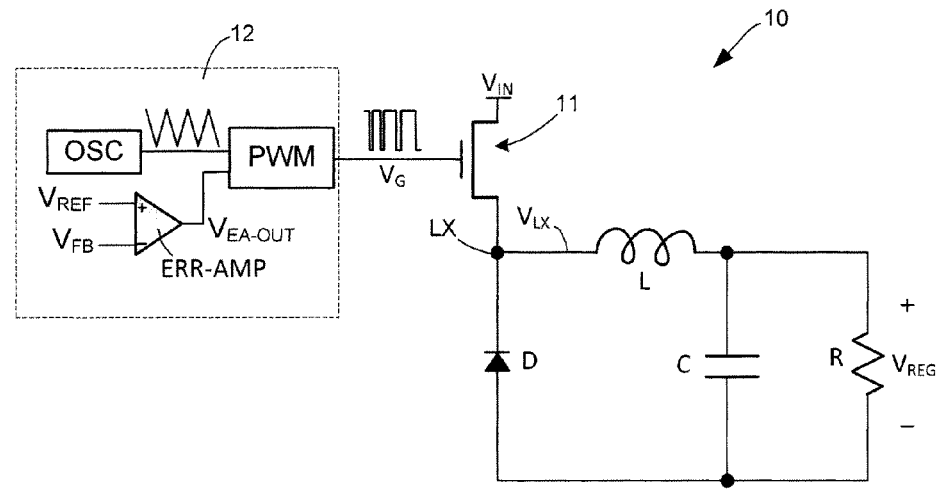
FIG. 4 is a circuit diagram showing a conventional buck converter.
Figure 5:
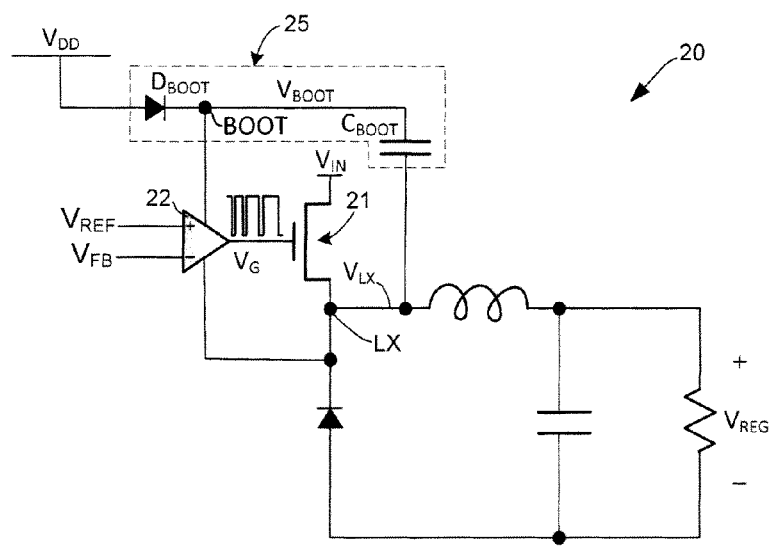
FIG. 5 is a circuit diagram showing a conventional bootstrapped buck converter.

FIGS. 3(A)-3(C) are circuit diagram showing the operating states and voltages of buck converter 100 during an exemplary operating period.

FIG. 3(A) shows buck converter 100(T0) (i.e., the operating states and voltages of at a time T0 corresponding to the beginning of the operating period), when system voltage $V_{DD}$ is at 5V and input voltage is at 24V, but high-side switch output voltage $V_{LX}$ is at 0V. The 0V potential at high-side switch output node LX causes PMOS switch 158 to turn on, thereby causing bootstrap diode 152 to forward bias, which in turn causes bootstrap voltage $V_{BOOT}$ (bootstrap node BOOT) to begin increasing toward approximately 4.3V (i.e., $V_{DD}$ minus the voltage drop $V_{DIODE}$ across bootstrap diode 152) as charge is stored on bootstrap capacitor 154.

FIG. 3(B) shows buck converter 100(T1) at a time T1 immediately after time T0, when bootstrap voltage $V_{BOOT}$ has increased to approximately 4.3V (i.e., $V_{DD}-V_{DIODE}$) such that a square wave signal $V_G$ generated by square-wave signal source 120, which substantially mirrors bootstrap voltage $V_{BOOT}$, causes NMOS switch 110 to partially turn on, thereby causing output voltage $V_{LX}$ to begin to increase. As high-side switch output voltage $V_{LX}$ increases, the increasing voltage is passed by way of bootstrap capacitor 154 to second bootstrap node BOOT, thereby causing bootstrap voltage $V_{BOOT}$ to increase by an amount equal to high-side switch output voltage $V_{LX}$ (i.e., $V_{BOOT} \approx V_{IN}+V_{DD}-V_{DIODE}$), whereby the increasing bootstrap voltage $V_{BOOT}$ allows square-wave signal source 120 to eventually fully turn on NMOS switch 110. At the same time, as high-side switch output voltage $V_{LX}$ increases toward input voltage $V_{IN}$, PMOS switch 158 is turned off and feedback diode 156 forward biases to charge first bootstrap node MID to the voltage level of high-side switch output voltage $V_{LX}$ minus the voltage drop across feedback diode 156 (i.e., $V_{MID} \approx V_{IN}-V_{DIODE}$). Note that, as this point, a maximum reverse voltage approximately equal to system voltage $V_{DD}$ is generated across bootstrap diode 152. By limiting system voltage $V_{DD}$ to 5V, bootstrap diode 152 can be implemented using a low-voltage CMOS diode as set forth above.

FIG. 3(C) shows the operating states and voltages of buck converter 100 at a time T2 subsequent to time T1, when the increasing voltage fed back to bootstrap node BOOT through capacitor 154 has reaching a voltage that fully turns on NMOS switch 110 so that output voltage $V_{LX}$ at switch output node LX is stabilized approximately at input voltage $V_{IN}$ (i.e., $V_{LX}=V_{IN}$), and is fed back through bootstrap capacitor 154 to second bootstrap node BOOT, thereby causing bootstrap voltage $V_{BOOT}$ to stabilize at approximately input voltage $V_{IN}+$ VDD-$V_{DIODE}$. PMOS switch 158 remains turned off and feedback diode 156 remains forward biased such that first bootstrap node MID is maintained approximately at $V_{IN}-V_{DIODE}$, creating minimal reverse biases across diodes 152 and 156.

During subsequent "normal" operation of buck converter 100, boot voltage $V_{BOOT}$ switches between $V_{IN}+V_{DD}-V_{DIODE}$ and $V_{DD}-V_{DIODE}$ in accordance with output voltage $V_{LX}$, which repeatedly switches between $V_{IN}$ and 0V as power is drawn by the load.

Figure 6:
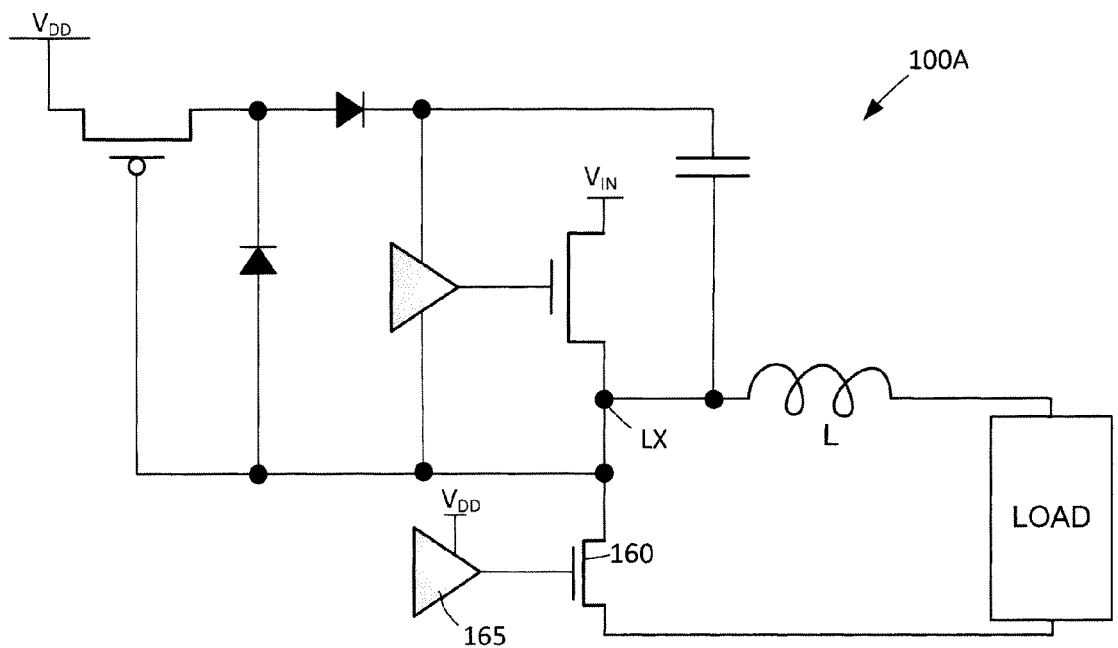
FIG. 6 shows a synchronous bootstrapped buck converter according to an alternative embodiment of the present invention.

Although the present invention has been described with respect to certain specific embodiments, it will be clear to those skilled in the art that the inventive features of the present invention are applicable to other embodiments as well, all of which are intended to fall within the scope of the present invention. For example, although the bootstrap circuit architecture is described herein with specific reference to a specific buck converter circuit, the bootstrap circuit may be beneficially utilized in many circuit arrangements, and is therefore not intended to be limited to the disclosed buck converter circuit unless otherwise specified in the appended claims. Similarly, although the bootstrap circuit architecture and the bootstrapped buck converter of the present invention are described herein with specific reference to a CMOS LED driver circuit utilizing a 24V-to-4V buck conversion, those skilled in the art will recognize that the bootstrapped buck converter may be convert any high input voltage and modified to generate any regulated voltage, and is therefore not limited to use in the context of an LED driver unless otherwise specified in the appended claims. Moreover, although the above embodiments include an asynchronous buck converter type including low-side diode D (see FIG. 1), FIG. 6 shows a synchronous bootstrapped buck converter 100A according to an alternative embodiment of the present invention in which the low side diode is replaced with NMOS transistor 160 controlled by a pre-driver 165 in accordance with known techniques, and synchronous bootstrapped buck converter 100A otherwise operates as described above.

The invention claimed is:

1. An integrated CMOS bootstrap circuit for temporarily supplying a first voltage from a system voltage supply to a bootstrap node in a CMOS device during a first time period, and for transmitting a second voltage from a switch output node to the bootstrap node during a second time period, the second voltage being different from the first voltage, the bootstrap circuit comprising:
    a bootstrap diode and a bootstrap capacitor connected in series and coupled between the system voltage supply and the switch output node, the bootstrap diode having an anode connected to a first bootstrap node and a cathode connected to a second bootstrap node, and the bootstrap capacitor being connected between the second bootstrap node and the switch output node;
    a feedback diode having an anode connected to the switch output node and a cathode connected to the first bootstrap node;
    a switch connected between the system voltage supply and the first bootstrap node; and
    means for controlling the switch to connect the system voltage supply to the first bootstrap node during the first time period, and for disconnecting the system voltage supply from the first bootstrap node during the second time period.

2. The bootstrap circuit according to claim 1, wherein the bootstrap diode comprises an integrated semiconductor CMOS diode having a low breakdown voltage that is higher than the first voltage from the system voltage supply.

3. The bootstrap circuit according to claim 1, wherein the bootstrap diode comprises a vertical NPN diode.

4. The bootstrap circuit according to claim 1, wherein at least one of the bootstrap diode and the feedback diode comprises a vertical NPN diode having a low breakdown voltage.

5. The bootstrap circuit according to claim 1, wherein the switch comprises a P-type metal oxide semiconductor (PMOS) transistor having a gate terminal connected to the switch output node.

6. The bootstrap circuit according to claim 5, wherein the PMOS transistor comprises a P-type laterally diffused metal oxide semiconductor (PLDMOS) transistor.

7. A CMOS bootstrapped buck converter for converting a relatively high input voltage into a relatively low regulated voltage that is supplied to a load circuit, both the bootstrapped buck converter and the load circuit being integrated in a CMOS device, the buck converter comprising:
    an N-type MOS transistor connected between an input supply of the high input voltage and a switch output node;
    an inductor connected between the switch output node and the load;
    means for generating a square-wave gate voltage on a gate terminal of the N-type MOS transistor such that a duty cycle of the square-wave gate voltage causes the N-type MOS transistor to intermittently connect the high input voltage supply to the switch output node, whereby the regulated load voltage is generated across the capacitor and the load; and
    a bootstrap circuit for temporarily supplying a system voltage from a system voltage supply to said square-wave gate voltage generating means at a first time period, and for transmitting a second voltage from the switch output node to said square-wave gate voltage generating means at a subsequent second time period, the second voltage being greater than the first voltage, wherein the bootstrap circuit includes:
        a bootstrap diode coupled between a first bootstrap node and a second bootstrap node, the second bootstrap node being connected to said square-wave gate voltage generating means;
        a bootstrap capacitor connected between the second bootstrap node and the switch output node;
        a feedback diode connected between the switch output node and the first bootstrap node;
        a P-type MOS transistor connected between a system voltage supply and the first bootstrap node and having a gate terminal connected to the switch output node.

8. The CMOS bootstrapped buck converter according to claim 7, wherein the bootstrap diode comprises an integrated semiconductor CMOS diode having a low breakdown voltage.

9. The CMOS bootstrapped buck converter according to claim 8, wherein the bootstrap diode comprises a vertical NPN diode.

10. The CMOS bootstrapped buck converter according to claim 7, wherein the P-type MOS transistor comprises a P-type laterally diffused metal oxide semiconductor (PLDMOS) transistor.

11. The CMOS bootstrapped buck converter according to claim 7, wherein the N-type MOS transistor comprises an N-type laterally diffused metal oxide semiconductor (NLDMOS) transistor.

12. The CMOS bootstrapped buck converter according to claim 7, wherein at least one of the bootstrap diode and the feedback diode comprises a low voltage integrated semiconductor CMOS diode having a low breakdown voltage that is lower than the relatively high input voltage.

13. The CMOS bootstrapped buck converter according to claim 12, wherein both the P-type MOS transistor and the N-type MOS transistor comprise laterally diffused metal oxide semiconductor (LDMOS) transistors.

14. A CMOS device comprising:
    a semiconductor substrate;
    means for providing both a system voltage at a system voltage node and a high input voltage at an input supply node, the high input voltage being greater than the first voltage, a bootstrapped buck converter for converting the high input voltage into a low regulated voltage, the bootstrapped buck converter being integrally formed on the semiconductor substrate, the bootstrapped buck converter comprising:
  an N-type MOS transistor connected between the input supply node and a switch output node;
  an inductor connected between the switch output node and a first output terminal, and a switch controlled by a pre-driver connected between a second output terminal and the switch output node;
  means for generating a square-wave gate voltage on a gate terminal of the N-type MOS transistor such that a duty cycle of the square-wave gate voltage causes the N-type MOS transistor to intermittently connect the high input voltage supply to the switch output node, whereby the regulated load voltage is generated across the first output terminal and the second output terminal; and
  a bootstrap circuit for temporarily supplying the system voltage from the system voltage node to said square-wave gate voltage generating means during a first operating period of the CMOS device, and for transmitting a second voltage from the switch output node to said square-wave gate voltage generating means during a second operating period, wherein the bootstrap circuit includes:
    a bootstrap diode coupled between a first bootstrap node and a second bootstrap node, the second bootstrap node being connected to said square-wave gate voltage generating means;
    a bootstrap capacitor connected between the second bootstrap node and the switch output node;
    a feedback diode connected between the switch output node and the first bootstrap node; and
    a P-type MOS transistor connected between a system voltage supply and the first bootstrap node and having a gate terminal connected to the switch output node; and
  a load circuit integrally formed on the semiconductor substrate and connected between the first output terminal and the second output terminal.

15. The CMOS device according to claim 14, wherein at least one of the bootstrap diode and the feedback diode comprises a low voltage integrated semiconductor CMOS diode having a low breakdown voltage.

16. The CMOS device according to claim 14, wherein at least one of the N-type MOS transistor the P-type MOS transistor comprises a laterally diffused metal oxide semiconductor transistor.

17. The CMOS device according to claim 14, wherein the load circuit comprises an LED driver circuit.

* * * * *